(12) United States Patent
Kang et al.

(10) Patent No.: US 7,929,250 B2
(45) Date of Patent: Apr. 19, 2011

(54) HEAD SLIDER HAVING AN AIR BEARING SURFACE (ABS) WITH A SHALLOW RECESS (SR) RETREATED BEHIND THE ABS AND A CAVITY RETREATED BEHIND THE ABS AND SR, HARD DISK DRIVE INCLUDING THE SAME, AND METHOD OF FLOATING THE SAME

(75) Inventors: Tae-sik Kang, Suwon-si (KR); Hyo-june Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1146 days.

(21) Appl. No.: 11/617,281

(22) Filed: Dec. 28, 2006

(65) Prior Publication Data
US 2007/0153422 A1    Jul. 5, 2007

(30) Foreign Application Priority Data
Dec. 29, 2005 (KR) .................. 10-2005-0133029

(51) Int. Cl.
*G11B 5/60* (2006.01)
(52) U.S. Cl. ................... 360/236.2; 360/236.9
(58) Field of Classification Search .............. 360/235.4, 360/235.5, 235.6, 235.7, 235.8, 235.9, 236, 360/236.1, 236.2, 236.3, 236.4, 236.5, 236.6, 236.7, 236.8, 236.9, 237, 237.1
See application file for complete search history.

(56) References Cited

U.S. PATENT DOCUMENTS

| | | | |
|---|---|---|---|
| 5,606,476 A | 2/1997 | Chang et al. | |
| 5,889,634 A | 3/1999 | Chang et al. | |
| 6,560,071 B2 | 5/2003 | Chapin et al. | |
| 6,999,282 B2 * | 2/2006 | Rao | 360/236 |
| 2003/0058578 A1 * | 3/2003 | Boutaghou et al. | 360/235.8 |
| 2003/0081352 A1 * | 5/2003 | Rao et al. | 360/235.4 |
| 2004/0027724 A1 * | 2/2004 | Pendray et al. | 360/236.3 |
| 2006/0132978 A1 * | 6/2006 | Tian et al. | 360/235.8 |
| 2006/0268460 A1 * | 11/2006 | Kondo | 360/235.8 |
| 2007/0211385 A1 * | 9/2007 | Kondo et al. | 360/236.1 |
| 2008/0198509 A1 * | 8/2008 | Bolasna et al. | 360/235.5 |

FOREIGN PATENT DOCUMENTS

JP    2005-38522    2/2005

* cited by examiner

*Primary Examiner* — Jefferson Evans
(74) *Attorney, Agent, or Firm* — Stanzione & Kim, LLP

(57) ABSTRACT

A head slider and a hard disk drive (HDD) including the head slider, the head slider including an air bearing surface (ABS) protruding from a disk facing surface of the head slider toward the disk, a shallow recess (SR) retreated behind the ABS, and a cavity recess (CR) retreated behind the ABS and the SR.

14 Claims, 8 Drawing Sheets

HEAD SLIDER HAVING AN AIR BEARING SURFACE (ABS) WITH A SHALLOW RECESS (SR) RETREATED BEHIND THE ABS AND A CAVITY RETREATED BEHIND THE ABS AND SR, HARD DISK DRIVE INCLUDING THE SAME, AND METHOD OF FLOATING THE SAME

CROSS-REFERENCE TO RELATED APPLICATIONS

This application claims priority under 35 U.S.C. §119(a) from Korean Patent Application No. 10-2005-0133029, filed on Dec. 29, 2005, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a shape of a surface of a head slider that faces a disk.

2. Description of the Related Art

Hard disk drives (HDDS) are auxiliary memory devices used in computers, MP3 players, and mobile phones to read data recorded on a disk using a magnetic head or to record new data on the disk. The magnetic head is formed on a head slider that is mounted on a front edge portion of an actuator in the HDD. The disk is mounted and rotated on a spindle motor, and the head slider is moved to a certain track on the disk by the actuator while floating at a predetermined height above the rotating disk. The magnetic head formed on the head slider records data on the certain track, or reads data recorded on the certain track.

In a normal operating status of the HDD, the floating height of the head slider is determined to be a height where an upward force of the head slider by air flowing through a disk facing surface of the head slider balances with an elastic force of a suspension in the actuator that supports the head slider. The upward force of the head slider is largely affected by changes of physical property of the air flowing through the disk facing surface of the head slider.

Recently, host systems, such as MP3 players and mobile phones, including the HDDs can be portable, and thus may be used in regions of high altitudes, for example, in mountains or planes. However, a density of air in highlands is lower than that of lowlands, and thus an atmospheric pressure is lowered and a molecular mean free path of air, that is, a distance over which a molecule of air can fly without colliding with other molecules, increases. In addition, when the altitude increases, a temperature of the atmosphere is lowered, and a viscosity thereof is reduced. The above changes of physical properties of the air reduce the upward force of the head slider.

FIG. 1 is a graph illustrating a result of a simulation using a conventional head slider. The graph of FIG. 1 illustrates a relationship between a floating height of the head slider and altitude in the conventional HDD.

Referring to FIG. 1, when the altitude becomes higher from a sea level altitude 0 kft to a sea level altitude 20 kft, the floating height of the head slider becomes lower. The decrease of the floating height of the head slider in highlands increases a possibility of collision between the head slider and a disk of the conventional HDD. Then, the head slider and the disk may be damaged due to such a collision, and a reliability of a performance of the conventional HDD may be degraded.

SUMMARY OF THE INVENTION

The present general inventive concept provides a head slider, a floating height of which is not lowered even in highlands, and a hard disk drive (HDD) including the head slider.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a head slider to float on a disk that is a data recording medium to record and/or read data, the head slider including an air bearing surface protruding from a disk facing surface of the head slider toward the disk, the air bearing surface comprising a first air bearing surface portion that is disposed closer to a leading edge of the disk facing surface of the head slider than to a trailing edge of the disk facing surface in a width direction of the disk facing surface, a pair of second air bearing surface portions extending from the leading edge toward the trailing edge on a center portion of the disk facing surface, and a third air bearing surface portion formed on the center portion of the disk facing surface closer to the trailing edge than to the leading edge; a shallow recess retreated behind the air bearing surface, the shallow recess comprising a first shallow recess portion formed around the first air bearing surface portion, and a second shallow recess portion formed around the pair of second air bearing surface portions; and a cavity recess retreated behind the air bearing surface and the shallow recess and formed on a portion the disk facing surface where the air bearing surface and the shallow recess are not formed.

The SR may further include a third SR portion around the third ABS portion.

The SR may further include a pair of side SR portions extending from the leading edge toward the trailing edge at both sides of the disk facing surface.

The ABS may further include a pair of side ABS portions extending from the leading edge toward the trailing edge at both sides of the disk facing surface.

The SR may further include a fourth SR portion formed on the pair of side ABS portions.

A height difference between the ABS and the SR may be about 0.08 μm to about 0.15 μm, and a height difference between the ABS and the CR may be about 1.0 μm to about 2.5 μm.

One of the second air bearing surface portions faces air flowing between a surface of the disk and the disk facing surface of the head slider when the head slider is located at an inner disk position earlier than the other of the second air bearing surface portions, and is closer to a vertical center line of the disk facing surface extending from the leading edge to the trailing edge than the other of the second air bearing surface portions.

One of the second air bearing surface portions faces air flowing between a surface of the disk and the disk facing surface of the head slider when the head slider is located at an inner disk position earlier than the other of the second air bearing surface portions, and has a first end portion adjacent to the trailing edge that is closer to a virtual center line of the disk facing surface extending from the leading edge to the trailing edge than a second end portion thereof adjacent to the leading edge.

The foregoing and/or other aspects and utilities of the present general inventive concept may also be achieved by providing a head slider of a hard disk drive, including first and second air bearing surfaces formed on a virtual center line of the head slider, the virtual center line extending from a trailing end to a leading end of the head slider and being equidistant from first and second sides of the head slider connecting the trailing end and the leading end, a shallow recess contacting the first and second air bearing surfaces to at least partially separate the first and second air bearing surfaces, and a cavity contacting the second air bearing surface, in which the first and second air bearing surfaces have a first height with respect to the cavity, and the shallow recess has a second height with respect to the cavity that is lower than first height.

The cavity may be spaced apart from the virtual center line by the first and second air bearing surfaces and the shallow recess The shallow recess may completely separate the first and second air bearing surfaces. The head slider may further include a third air bearing surface to connect ends of the first and second air bearings surfaces near the leading edge of the head slider. A magnetic head may be disposed on the second air bearing surface near the trailing edge of the head slider. The first height may be about 1.0 μm to about 2.5 μm with respect to the cavity. A difference between the first height and the second height may be about 0.08 μm to about 0.15 μm. A portion of the shallow recess may be closer to the leading edge of the head slider than the first and second air bearing surfaces.

The first air bearing surface may include a first portion extending along the virtual center line of the head slider and a second portion disposed near the leading edge of the head slider and extending in a lateral direction towards the first side of the head slider, and the second air bearing surface may include a third portion disposed near the leading edge of the head slider and extending in a lateral direction towards the second side of the head slider, a fourth portion including a magnetic head and disposed near the trailing edge of the head slider, and a fifth portion extending parallel to the first portion to connect the third and fourth portions. The head slider may further include first and second side shallow recesses spaced apart from the shallow recess by the first and second air bearing surfaces, respectively.

The foregoing and/or other aspects and utilities of the present general inventive concept may also be achieved by providing a hard disk drive, including a disk to store data, a head slider having a magnetic head to record and/or to read the data to and/or from the disk, the head slider including first and second air bearing surfaces formed on a virtual center line of the head slider, the virtual center line extending from a trailing end to a leading end of the head slider and being equidistant from first and second sides of the head slider connecting the trailing end and the leading end, a shallow recess contacting the first and second air bearing surfaces to at least partially separate the first and second air bearing surfaces, and a cavity contacting the second air bearing surface, and a swing arm to elastically press the head slider towards the disk, in which the first and second air bearing surfaces have a first height with respect to the cavity, and the shallow recess has a second height with respect to the cavity that is lower than first height.

The foregoing and/or other aspects and utilities of the present general inventive concept may also be achieved by providing a method of floating a head slider of a hard disk drive, the method including elastically pressing the head slider towards a disk of the hard disk drive, generating a positive pressure on first and second air bearing surfaces formed on a virtual center line of the head slider, the virtual center line extending from a trailing end to a leading end of the head slider and being equidistant from first and second sides of the head slider connecting the trailing end and the leading end, the first and second air bearing surfaces being at least partially separated from each other by a shallow recess contacting the fist and second air bearing surfaces, and generating a negative pressure on a cavity contacting the second air bearing surface, in which the first and second air bearing surfaces have a first height with respect to the cavity, and the shallow recess has a second height with respect to the cavity that is lower than first height.

The elastically pressing of the head slider, the generating of the positive pressure, and the generating of the negative pressure may together maintain a floating height of the head slider of about 0.5 μ-inch or higher at any altitude.

The foregoing and/or other aspects and utilities of the present general inventive concept may also be achieved by providing a head slider of a hard disk drive having a disk, including a disk facing surface having a cavity recess, an air bearing surface having a first height from the cavity recess, and comprising first air bearing surface portions disposed adjacent to a leading edge of the disk facing surface on opposite areas of the cavity recess, second air bearing surface portions extended from corresponding ones of the first air bearing surface portions toward a trailing edge of the disk facing surface and having first and second lengths in a direction from the leading edge to the trailing edge, and a third air bearing surface portion extended from one of the second air bearing surface portions and formed with a magnetic head disposed thereon in a virtual center line of the disk facing surface, and a shallow recess having a second height from the cavity recess, disposed between the first air bearing surface portions, and disposed between the second air bearing surface portions.

The third air bearing surface portion may include a first end connected to one of the second air bearing surface portions, and a second end extended in a direction from the trailing edge to the leading edge and spaced apart from another one of the second air bearing surface portions. The one of the second air bearing surface portions may be longer than the other one of the second air bearing surface portions. The second end may be disposed opposite to the first end with respect to the virtual center line. At least a portion of the other one of the second air bearing surface portions may be disposed on the virtual center line. The one of the second air bearing surface portions may be disposed at a location not on the virtual center line.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
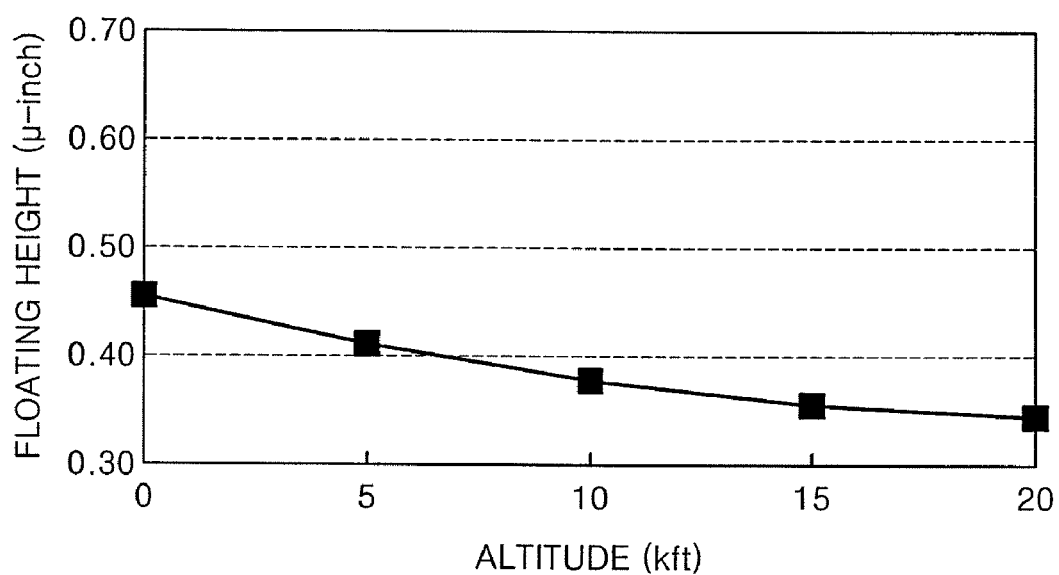
FIG. 1 is a graph illustrating a relationship between a floating height of a head slider and altitude in a conventional hard disk drive (HDD)

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
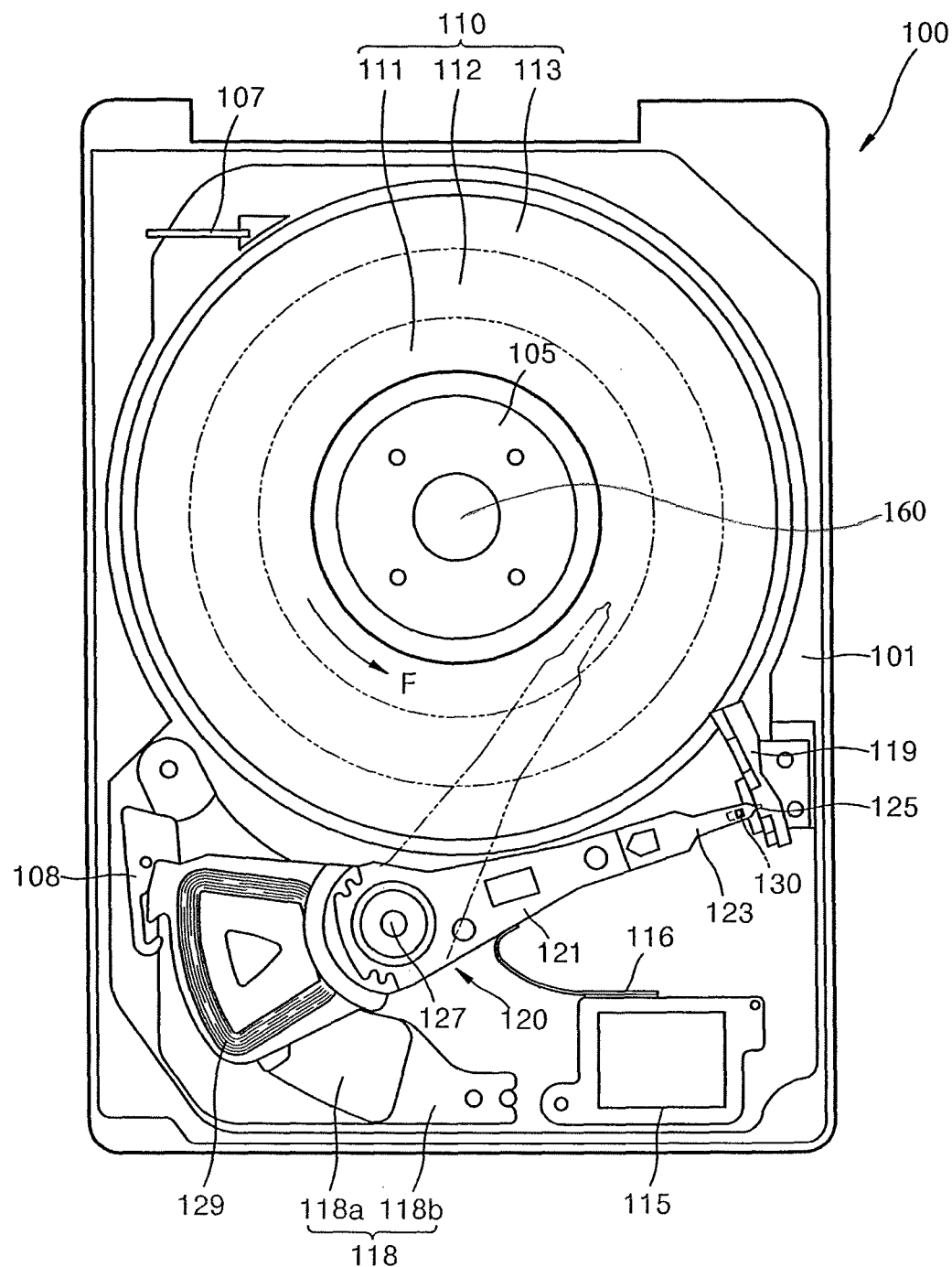
FIG. 2 is a plan view illustrating an HDD, according to an embodiment of the present general inventive concept.

FIG. 2 is a plan view illustrating a hard disk drive (HDD) 100, according to an embodiment of the present general inventive concept.

Referring to FIG. 2, the HDD 100 includes a spindle motor 105, a disk 110 that is a data storing medium, an actuator 120, and a voice coil motor (VCM) 118 in a housing having a base member 101 and a cover member (not illustrated) coupled to the base member 101.

The spindle motor 105 rotates the disk 110, and is fixedly installed on the base member 101. The disk 110 is coupled to the spindle motor 105 and rotates in a direction denoted by arrow F at a high speed. Due to the rotation of the disk at the high speed, air flowing in the direction denoted by the arrow F is generated on a surface of the disk 110.

Figure 3:
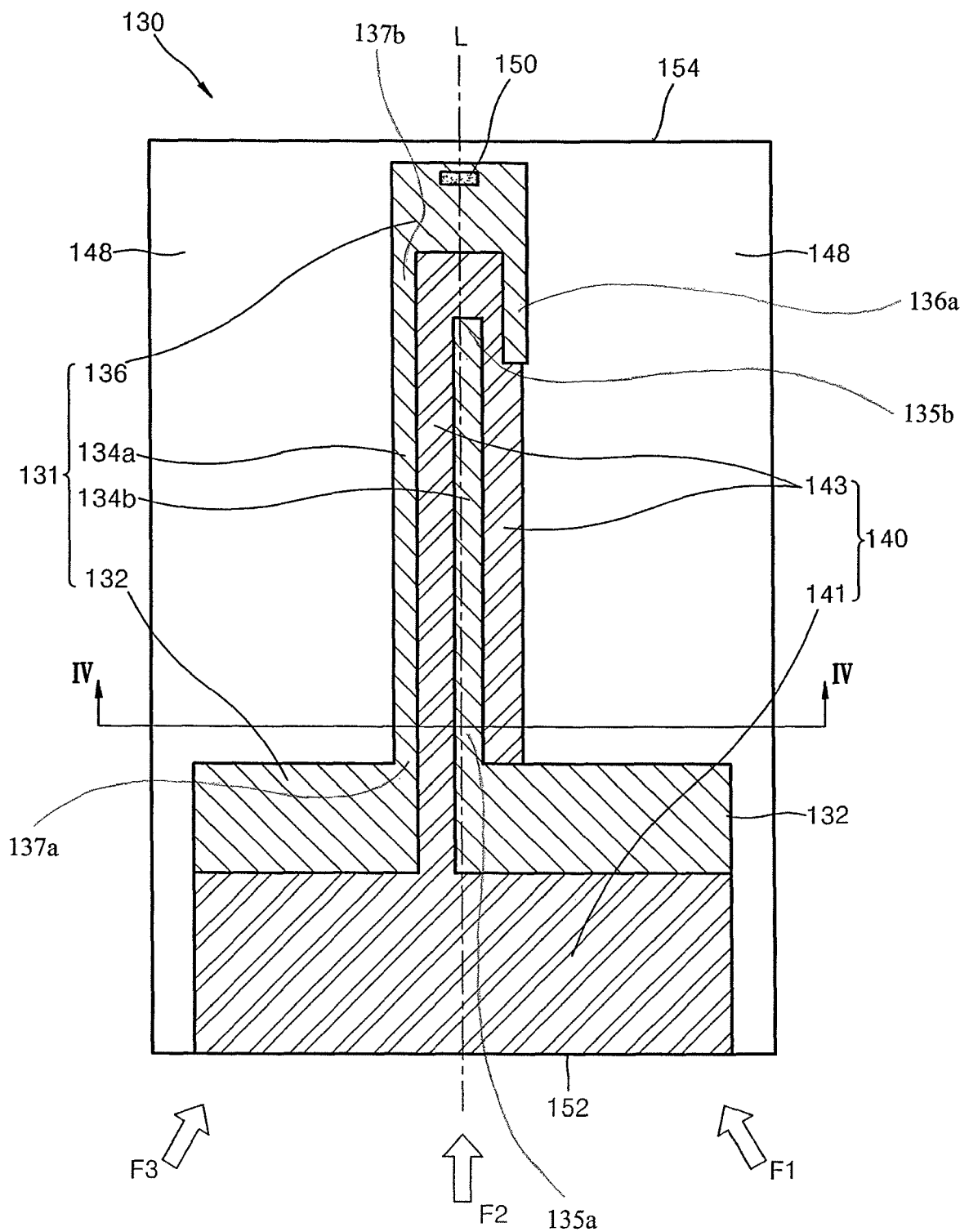
FIG. 3 is a plan view illustrating a disk facing surface of a head slider in the HDD of FIG. 2, according to the embodiment of the present general inventive concept.

The actuator 120 includes a head slider 130 having a magnetic head (such as a magnetic head 150, as illustrated in FIG. 3) to record data onto the disk 110 or to read data recorded on the disk 110 by moving the head slider 130 to a certain position on the disk 110. The actuator 120 further includes a swing arm 121, a suspension 123 fixedly coupled to a front edge of the swing arm 121 to elastically press the head slider 130 toward the surface of the disk 110, and the head slider 130 adhered onto a front edge of the suspension 123. The magnetic head (such as the magnetic head 150, as illustrated in FIG. 3) is disposed on a disk facing surface of the head slider 130. The actuator 120 is installed to rotate based on a pivot 127 of the base member 101. An end-tap 125 that is supported by contacting a ramp 119 when the head slider 130 parks is formed on a front edge portion of the suspension 123.

When the air flow generated by the high speed rotation of the disk 110 passes between a surface of the disk 110 and the disk facing surface of the head slider 130, an upward force is applied to the head slider 130. Then, the head slider 130 floats at a height where the upward force and an elastic pressing force of the suspension 123 to press the head slider 130 toward the disk 110 are balanced. In the above floating status of the head slider 130, the magnetic head (such as the magnetic head 150, as illustrated in FIG. 3) reproduces data in the disk 110 or records data onto the disk.

The VCM 118 fixedly installed on the base member 101 provides the actuator 120 with a rotating force. The VCM 118 includes a magnet 118a disposed on upper and lower portions of a VCM coil 129 of the actuator 120, and a yoke 118b supporting the magnet 118a. The VCM 118 is controlled by a servo control system, and rotates the actuator 120 by an interaction between an electric current input into the VCM coil 129 and a magnetic field formed by the magnet 118a in a direction according to Fleming's Left-hand Rule.

When operation of the HDD 100 is suspended, the actuator 120 rotates in a clockwise direction, and thus, the head slider 130 moves from a loading state, that is, from the position on the disk 110, to an unloading state, that is, to the ramp 119. On the contrary, when the HDD 100 starts operating, the actuator 120 rotates in a counter-clockwise direction, and thus, the head slider 130 moves from the unloading position, that is, the position where the head slider 130 is parked on the ramp 119, to the loading position, that is, onto the disk 110.

In a status where the head slider 130 is parked on the ramp 119, the actuator 120 may be undesirably rotated by external shocks or vibrations applied onto the HDD 100, and as a result, the head slider 130 and the disk 110 may be damaged by contacting each other. Therefore, in the state where the head slider 130 is parked on the ramp 119, the head slider 130 should be locked at a predetermined position so that the actuator 120 does not rotate due to the external shocks or vibrations. To lock the head slider 130 in the parked position, the HDD 100 may include a latch 108. A flexible printed circuit (FPC) bracket 115 may be disposed on a first corner of the base member 101 in order to connect an FPC 116 that is connected to the actuator 120 to a main circuit board (not illustrated) disposed under the base member 101. In addition, a circulation filter 107 to filter impurities, such as particles included in the air flowing in the HDD 100, may be disposed on a second corner of the base member 101 diagonal from the first corner where the FPC bracket 115 is formed, as illustrated in FIG. 2.

Figure 4:
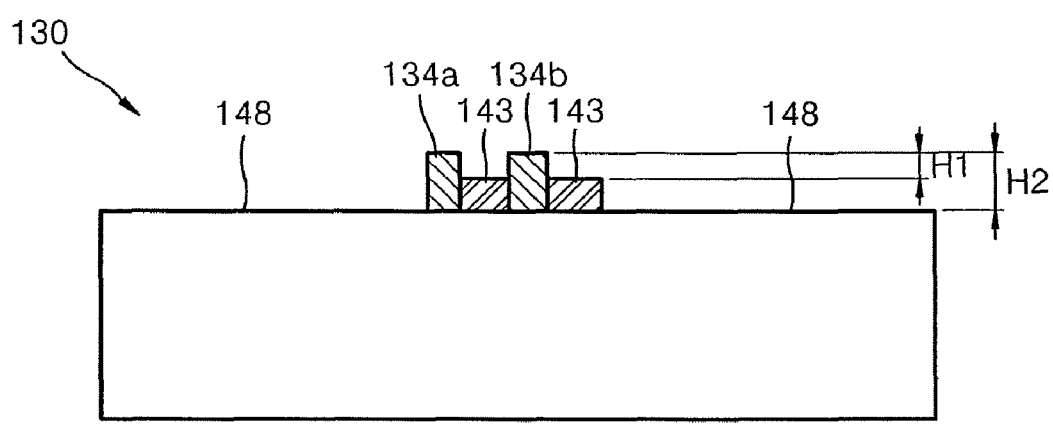
FIG. 4 is a cross-sectional view illustrating the disk facing surface of FIG. 3 taken along line IV-IV.

FIG. 3 is a plan view illustrating a disk facing surface of the head slider 130 of the HDD 100 illustrated in FIG. 2, and FIG. 4 is a cross-sectional view illustrating the disk facing surface of the head slider 130 of FIG. 3 taken along line IV-IV.

Referring to FIGS. 3 and 4, the head slider 130 includes an air bearing surface (ABS) 131 protruding from the disk facing surface toward the disk 110 (see FIG. 2), a shallow recess (SR) 140 recessed behind the ABS 131, and a cavity recess (CR) 148 recessed behind the ABS 131 and the SR 140. The CR 148 is formed on a portion of the disk facing surface where the ABS 131 and the SR 140 are not formed.

The ABS 131 is a protruding area to which a positive pressure is applied to separate the head slider 130 from the surface of the disk 110 using the air flow passing between the disk facing surface of the head slider 130 and the surface of the disk 110. The ABS 131 includes a first ABS portion 132 that is closer to a leading edge 152 on the disk facing surface than to a trailing edge 154 and extends in a width direction of the head slider 130. In addition, the ABS 131 further includes a pair of second ABS portions 134a and 134b extending from the leading edge 152 toward the trailing edge 154 at a center portion of the disk facing surface, and a third ABS portion 136 formed on the center portion of the disk facing surface to be closer to the trailing edge 154 than to the leading edge 152. The magnetic head 150 is formed on the third ABS portion 136 that is adjacent to the trailing edge 154. Here, the leading edge 152 is a surface through which the air flow caused by the rotation of the disk 110 is induced into the head slider 130, and the trailing edge 154 is a surface through which the air flow exits the head slider 130.

Meanwhile, when the actuator 120 pivots in a counter-clockwise direction and the head slider 130 is located on the inner disk 111 of the disk 110 as denoted by a virtual line in FIG. 2, the airflow is induced from an approximately 5 o'clock position with respect to the disk 111, that is, slanted in the counter-clockwise direction with respect to the leading edge 152, as denoted by arrow F1 of FIG. 3. When the head slider 130 is located on the middle disk 112 of the disk 110, the air flow is induced from the front portion of the leading edge 152, for example, from an approximately 6 o'clock position with respect to the disk 111, as denoted by arrow F2 of FIG. 3. In addition, when the head slider 130 is located on the outer disk 113 of the disk 110, the air is induced from an approximately 7 o'clock position with respect to the disk 111, that is, slanted in a clockwise direction with respect to the leading edge 152, as denoted by arrow F3 of FIG. 3.

A linear velocity of the air flow on the inner disk 111 is lower than a linear velocity of the air flow on the middle disk 112 and the outer disk 113, since the inner disk 111 is relatively close to the a rotating axis 160 (see FIG. 2) of the disk 110. Therefore, if left and right portions on the disk facing surface of the head slider 130 are formed symmetrically, the upward force generated by the air flow induced from the arrow F1 becomes smaller than the upward force generated by the air flow induced from the arrows F2 and F3 directions. To prevent this, the second ABS portions 134a and 134b are asymmetrically formed. In more detail, the second ABS portion 134b that faces the air flow induced from the arrow F1 earlier than the other second ABS portions 134a is closer to a virtual center line (L) of the head slider 130 than the other second ABS portion 134a. In addition, a first end 135a of the second ABS portion 134b is connected to the first ABS portion 132 and a second end 135b of the second ABS portion 134b is cut off from (not connected to) the third ABS portion 136. However, first and second ends 137a and 137b of the second ABS portion 134a are respectively connected to the first ABS portion 132 and to the third ABS portion 136. The third ABS portion 136 has one end 136a extended therefrom opposite to the other end connected to the second ABS portion 134a.

The SR 140 includes a first SR portion 141 formed around the first ABS portion 132, and a second SR portion 143 formed around the pair of second ABS portions 134a and 134b. The SR 140 protrudes further than the CR 148 and less than the ABS 131, as illustrated in FIG. 4. Since the first SR portion 141 steppedly falls from the first ABS 132 (is stepped with the first ABS 132), a lifting pressure can easily be generated by inducing the air flow to help the head slider 130 float quickly from the disk 110. In addition, most of the CR 148 is closer to the trailing edge 154 than the first ABS portion 132, and a negative pressure is generated on the CR 148 to help the head slider 130 float stably when positions of the head slider 130 are changed, such as by a rolling and a pitching of the head slider 130. In the present embodiment, a height H1 of a step between the ABS 131 and the SR 140 is about 0.08 to about 0.15 μm, and a height H2 of a step between the ABS 131 and the CR 148 is about 1.0 to about 2.5 μm.

Figure 5:
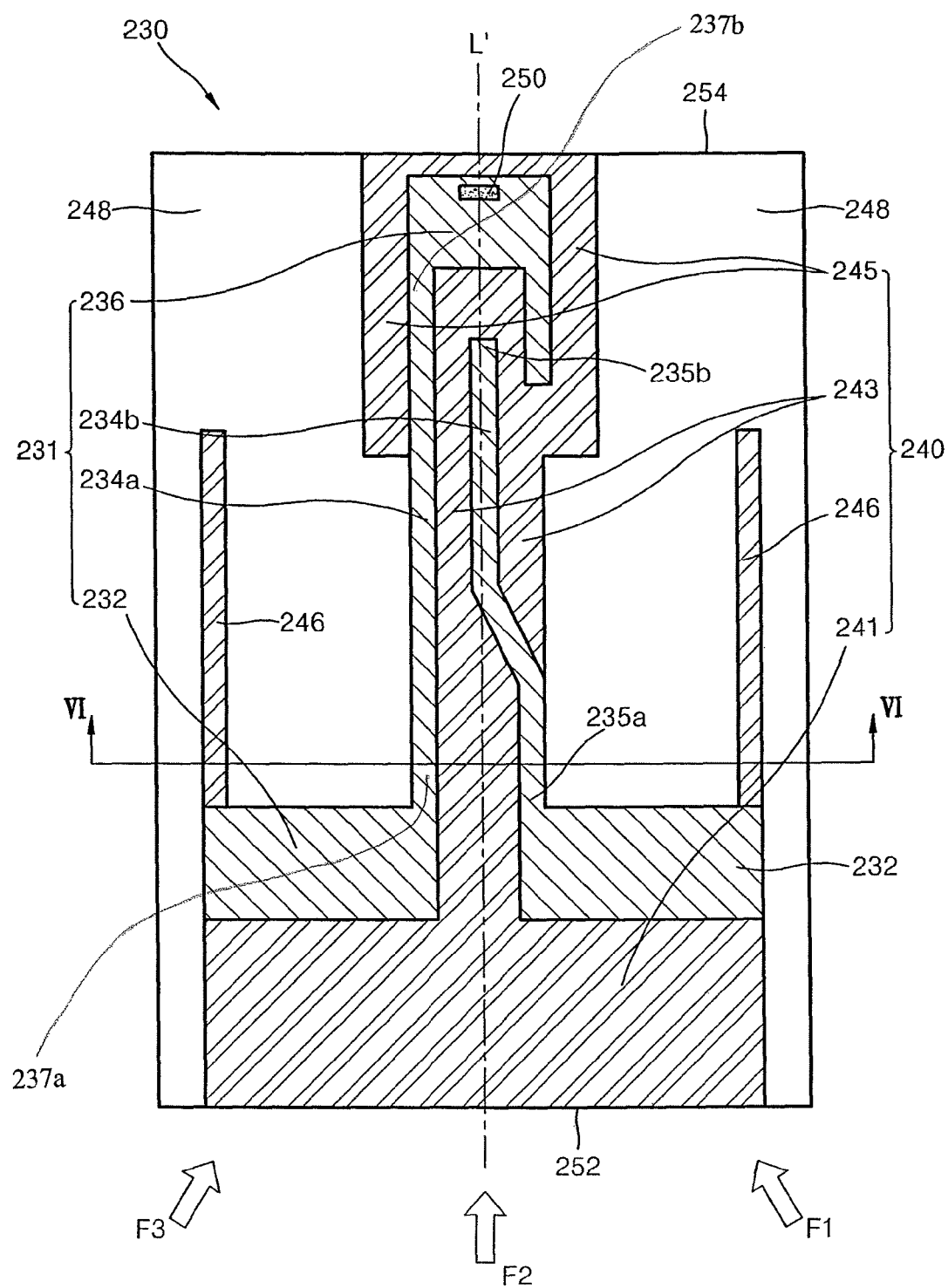
FIG. 5 is a plan view illustrating a disk facing surface of the head slider in the HDD of FIG. 2, according to another embodiment of the present general inventive concept.
Figure 6:
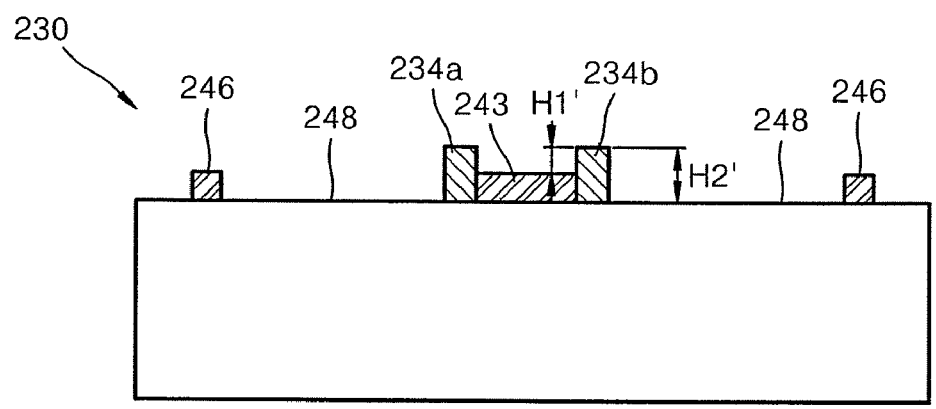
FIG. 6 is a cross-sectional view illustrating the disk facing surface of FIG. 5 taken along line VI-VI.

FIG. 5 is a plan view illustrating a disk facing surface of a head slider 230 of the HDD 100 of FIG. 2, according to an embodiment of the present general inventive concept, and FIG. 6 is a cross-sectional view illustrating the disk facing surface of the header slider 230 of FIG. 5 taken along line VI-VI. The head slider 230 according to the present embodiment can substitute for the head slider 130 in the hard disk drive 100 of FIG. 2.

Referring to FIGS. 5 and 6, the head slider 230 includes an ABS 231 protruding from the disk facing surface toward the disk 110 (see FIG. 2), an SR 240 retreated behind the ABS 231, and a CR 248 retreated behind the ABS 231 and the SR 240. The CR 248 is formed on the disk facing surface where the ABS 231 and the SR 240 are not formed.

The ABS 231 is a protruding region to which a positive pressure is applied to separate the head slider 230 from the disk 110 using the air flowing between the disk facing surface of the head slider 230 and the surface of the disk 110. The ABS 231 includes a first ABS portion 232 that is closer to a leading edge 252 than to a trailing edge 254 on the disk facing surface and extends in a width direction of the head slider 230. In addition, a pair of second ABS portions 234a and 234b extend from the leading edge 252 to the trailing edge 254 on a center portion of the disk facing surface, and a third ABS portion 236 that is closer to the trailing edge 254 than to the leading edge 252 is formed on the center portion of the disk facing surface, as illustrated in FIG. 5. A magnetic head 250 is formed on the third ABS portion 236 that is close to the trailing edge 254.

As described above with reference to FIGS. 3 and 4, if left and right portions of the disk facing surface of the head slider 230 are formed symmetrically, the upward force generated by the air induced into the leading edge 252 in a direction denoted by arrow F1 becomes smaller than the upward force generated by the air induced in directions denoted by arrows F2 and F3. In order to prevent this, the second ABS portions 234a and 234b are formed asymmetrically. In more detail, the second ABS portion 234b, which faces the airflow induced from the direction denoted by the arrow F1 earlier than the second ABS portion 234a, has a first end portion 235b adjacent to the trailing edge 254 that is closer to a virtual center line L' of the disk facing surface than a second end portion 235a adjacent to the leading edge 252. In addition, the first end portion 235a of the second ABS portion 234b, which is adjacent to the leading edge 252, is connected to the first ABS portion 232, and the second end portion 235b of the second ABS portion 234b is cut off from (not connected to) the third ABS portion 236. However, first and second ends 237a and 237b of the second ABS portion 234a are respectively connected to the first ABS portion 232 and the third ABS portion 236.

The SR 240 includes a first SR portion 241 formed around the first ABS portion 232, a second SR portion 243 formed around the pair of second ABS portions 234a and 234b, and a third SR portion 245 formed around the third ABS portion 236. In addition, the SR 240 further includes a pair of side SR portions 246 on both sides in the width direction of the disk facing surface of the head slider 230, which extend from the leading edge 252 toward the trailing edge 254. As described with reference to FIGS. 3 and 4, since the first SR portion 241 is stepped from the first ABS portion 232, a positive pressure lifting pressure can easily be generated by the airflow to help the head slider 230 float rapidly from the disk 110. In addition, a negative pressure is generated on a region on the CR 248 surrounded by the side SR portion 246 and the first ABS portion 232 to help the head slider 230 float stably when the position of the head slider 230 is changed, for example, by a rolling operation or a pitching operation. A height H1' of a step between the ABS 231 and the SR 240 is about 0.08 to about 0.15 μm, and a height H2' of a step between the ABS 231 and the CR 248 is about 1.0 to about 2.5 μm.

Figure 7:
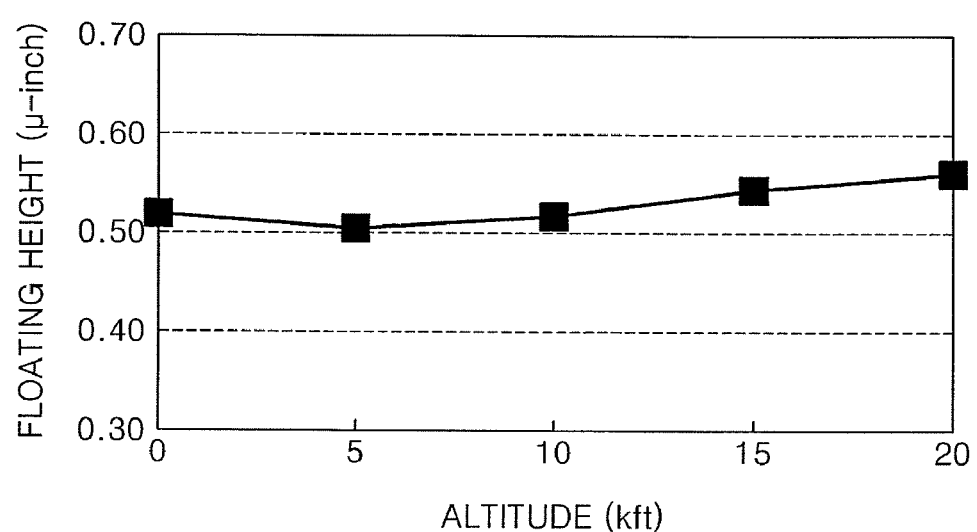
FIG. 7 is a graph illustrating a relationship between a floating height of the head slider of FIGS. 5 and 6 and altitude.

FIG. 7 is a graph illustrating a simulation result executed using the head slider 230 of FIGS. 5 and 6, according to an embodiment of the present general inventive concept. In this simulation, a small size HDD including a 0.85 inch disk was used, and a floating height of the head slider 230 at a middle disk of the small size HDD was plotted. Referring to FIG. 7, unlike a conventional head slider (see, for example, FIG. 1), the floating height of the head slider 230 in highlands (sea level altitude 20 kft) is higher than the floating height of the head slider 230 in lowlands (sea level altitude 0 kft), and a floating height of 0.5 μ-inch or higher is maintained at all altitude regions.

Figure 8:
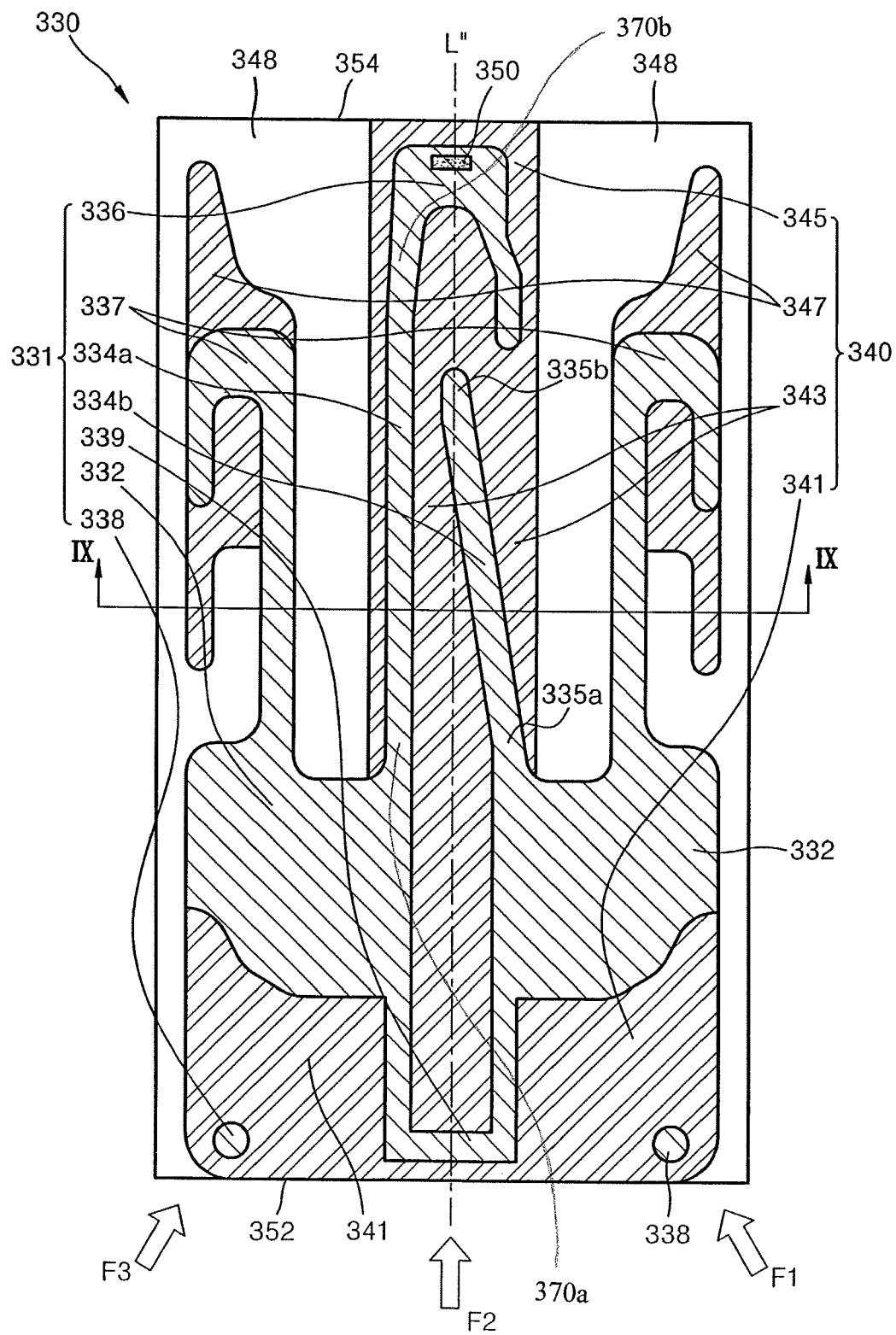
FIG. 8 is a plan view illustrating a disk facing surface of the head slider in the HDD of FIG. 2, according to another embodiment of the present general inventive concept.
Figure 9:
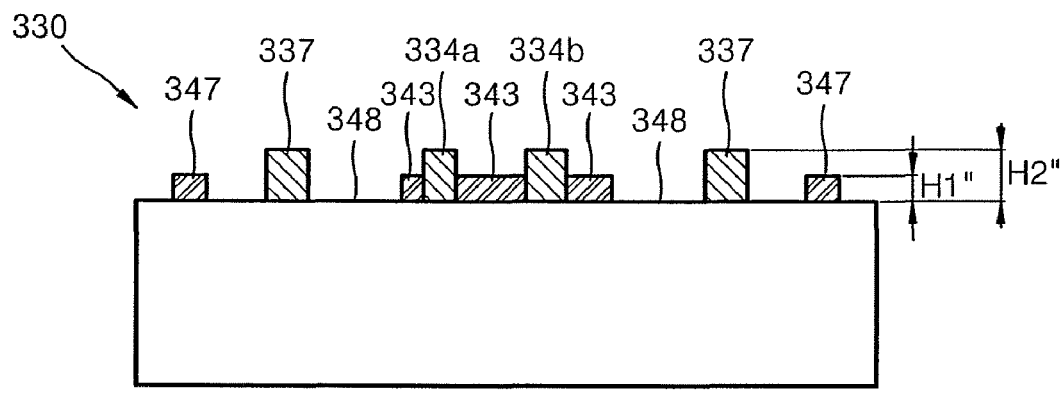
FIG. 9 is a cross-sectional view illustrating the disk facing surface of FIG. 8 taken along line IX-IX.
Figure 10:
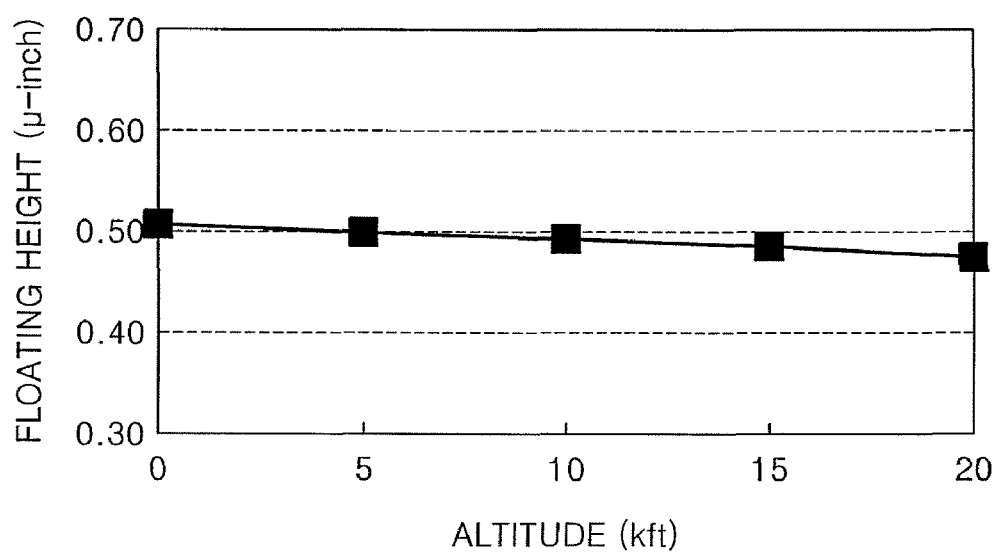
FIG. 10 is a graph illustrating a relationship between a floating height of the head slider of FIGS. 8 and 9 and altitude.

FIG. 8 is a plan view illustrating a disk facing surface of a head slider 330 of the HDD 100 of FIG. 2, according to another embodiment of the present general inventive concept, FIG. 9 is a cross-sectional view illustrating the disk facing surface of the header slider 330 of FIG. 8 taken along line IX-IX, and FIG. 10 is a graph illustrating floating heights of the head slider 330 of FIGS. 8 and 9 versus altitude. The head slider 330 according to the present embodiment can substitute for the head slider 130 in the HDD 100 of FIG. 2.

Referring to FIGS. 8 and 9, the head slider 330 includes an ABS 331 protruding from the disk facing surface toward the disk 110 (see FIG. 2), an SR 340 retreated behind the ABS 331, and a CR 348 retreated behind the ABS 331 and the SR 340. The CR 348 is formed on a region on the disk facing surface, where the ABS 331 and the SR 340 are not formed.

As described above with reference to FIGS. 3 and 4, the ABS 331 is a protruding region to which a positive pressure is applied to separate the head slider 330 from the disk 110 using the air flowing between the disk facing surface of the head slider 230 and the surface of the disk 110. The ABS 331 includes a first ABS portion 332 that is closer to a leading edge 352 than to a trailing edge 354 on the disk facing surface and extends in a width direction of the disk 110. In addition, a pair of second ABS portions 334a and 334b extend from the leading edge 352 to the trailing edge 354 on a center portion in the width direction of the disk facing surface, and a third ABS portion 336 that is closer to the trailing edge 354 than to the leading edge 352 is formed on the center portion in the width direction of the disk facing surface. A magnetic head 350 is formed on the third ABS portion 336 that is close to the trailing edge 354.

In addition, the ABS 331 further includes a pair of side ABS portions 337 extending from the leading edge 352 toward the trailing edge 354 at both sides of the disk facing surface of the head slider 330 in the width direction, a pair of corner ABS portions 338 formed at both corners adjacent to the leading edge 352, and a connection ABS portion 339 connecting the first ABS portion 332 that is separated into two parts.

As described above with reference to FIGS. 3 and 4, if left and right portions of the disk facing surface of the head slider 330 are formed symmetrically, the upward force generated by the air induced into the leading edge 352 in a direction denoted by arrow F1 becomes smaller than the upward force generated by the air induced in directions denoted by arrows F2 and F3. In order to prevent this, the second ABS portions 334a and 334b are formed asymmetrically. In more detail, the second ABS portion 334b, which faces the air flow induced from the direction denoted by the arrow F1 earlier than the other second ABS portion 334a, has a first end portion 335b adjacent to the trailing edge 354 that is closer to a virtual center line L' of the disk facing surface than a second end portion 335a adjacent to the leading edge 352 is. In addition, the first end portion 335a of the second ABS portion 334b, which is adjacent to the leading edge 352, is connected to the first ABS portion 332, and the second end portion 335b is cut off from (not connected to) the third ABS portion 336. However, first and second ends 370a and 370b of the second ABS portion 334a are respectively connected to the first ABS portion 332 and the third ABS portion 336.

The SR 340 includes a first SR portion 341 formed around the first ABS portion 332, a second SR portion 343 formed around the pair of second ABS portions 334a and 334b, a third SR portion 345 formed around the third ABS portion 336, and a fourth SR portion 347. As described with reference to FIGS. 3 and 4, since the first SR portion 341 is stepped from the first ABS portion 332, a positive pressure lifting pressure can easily be generated by the air flow to help the head slider 330 float rapidly from the disk 110. In addition, a negative pressure is generated on a region on the CR 348 surrounded by the first ABS portion 332, the side ABS portion 337, and the third SR portion 345 to help the head slider 330 float stably when the position of the head slider 330 is changed, for example, by a rolling operation or a pitching operation. A height H1" of a step between the ABS 331 and the SR 340 is about 0.08 to about 0.15 μm, and a height H2" of a step between the ABS 331 and the CR 348 is about 1.0 to about 2.5 μm.

FIG. 10 is a graph illustrating a simulation result executed using the head slider 330 of FIGS. 8 and 9, according to an embodiment of the present general inventive concept. In this simulation, a small size HDD including an 0.85 inch disk was used, and a floating height of the head slider 330 at a middle disk of the small size HDD was plotted.

Referring to FIG. 10, the floating height of the head slider 330 in highlands (sea level altitude 20 kft) is slightly lower than the floating height of the head slider 330 in lowlands (sea level altitude 0 kft). However, the floating height at the highlands is about 95% of the floating height in the lowlands, that is, a floating height of about 0.5 μ-inch or higher is maintained at all altitude regions.

According to the present general inventive concept, a floating height of a head slider of an HDD is not greatly lowered even in highlands, and thus damages due to a collision between the head slider and a disk can be prevented, and a performance reliability of the HDD can be improved in highlands.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents

What is claimed is:

1. A head slider to float on a disk that is a data recording medium to record and/or read data, the head slider comprising:
    an air bearing surface protruding from a disk facing surface of the head slider toward the disk, the air bearing surface comprising a first air bearing surface portion that is disposed closer to a leading edge of the disk facing surface of the head slider than to a trailing edge of the disk facing surface in a first direction of the disk facing surface, a pair of second air bearing surface portions extending from the leading edge toward the trailing edge on a center portion of the disk facing surface, and a third air bearing surface portion formed on the center portion of the disk facing surface closer to the trailing edge than to the leading edge;
    a shallow recess retreated behind the air bearing surface, the shallow recess comprising a first shallow recess portion formed around the first air bearing surface portion, and a second shallow recess portion formed adjacent to the pair of second air bearing surface portions; and
    a cavity recess retreated behind the air bearing surface and the shallow recess and formed on a portion the disk facing surface where the air bearing surface and the shallow recess are not formed,
    wherein one of the second air bearing surface portions faces air flowing between a surface of the disk and the disk facing surface of the head slider when the head slider is located at an inner disk position earlier than the other of the second air bearing surface portions, and is closer to a vertical center line of the disk facing surface extending from the leading edge to the trailing edge than the other of the second air bearing surface portions.

2. The head slider of claim 1, wherein the shallow recess further comprises:
a third shallow recess portion around the third air bearing surface portion.

3. The head slider of claim 1, wherein the shallow recess further comprises:
a pair of side shallow recess portions extending from the leading edge toward the trailing edge at both sides of the disk facing surface.

4. The head slider of claim 1, wherein the air bearing surface further comprises:
a pair of side air bearing surface portions extending from the leading edge toward the trailing edge at both sides of the disk facing surface.

5. The head slider of claim 4, wherein the shallow recess further comprises:
a fourth shallow recess portion formed on the pair of side air bearing surface portions.

6. The head slider of claim 1, wherein a height difference between the air bearing surface and the shallow recess is about 0.08 μm to about 0.15 μm, and a height difference between the air bearing surface and the cavity recess is about 1.0 μm to about 2.5 μm.

7. The head slider of claim 1, wherein one of the second air bearing surface portions faces air flowing between a surface of the disk and the disk facing surface of the head slider when the head slider is located at an inner disk position earlier than the other of the second air bearing surface portions, and has a first end portion adjacent to the trailing edge that is closer to a virtual center line of the disk facing surface extending from the leading edge to the trailing edge than a second end portion thereof adjacent to the leading edge.

8. A hard disk drive comprising:
a disk that is a data recording medium; and
a head slider floating on the disk to record or read the data, the head slider comprising:
an air bearing surface protruding from a disk facing surface of the head slider toward the disk, the air bearing surface comprising a first air bearing surface portion that is disposed closer a leading edge of the disk facing surface of the head slider than to a trailing edge of the disk facing surface in a width direction of the disk facing surface, a pair of second air bearing surface portions extending from the leading edge toward the trailing edge on a center portion of the disk facing surface, and a third air bearing surface portion formed on the center portion of the disk facing surface closer to the trailing edge than to the leading edge;
a shallow recess retreated behind the air bearing surface, the shallow recess comprising a first shallow recess portion formed around the first air bearing surface portion, and a second shallow recess portion formed around the pair of second air bearing surface portions; and
a cavity recess retreated behind the air bearing surface and the shallow recess, and formed on a portion the disk facing surface where the air bearing surface and the shallow recess are not formed,
wherein one of the second air bearing surface portions faces air flowing between a surface of the disk and the disk facing surface of the head slider when the head slider is located at an inner disk position earlier than the other of the second air bearing surface portions, and is closer to a vertical center line of the disk facing surface extending from the leading edge to the trailing edge than the other of the second air bearing surface portions.

9. The hard disk drive of claim 8, wherein the shallow recess further comprises:
a third shallow recess portion around the third air bearing surface portion.

10. The hard disk drive of claim 8, wherein the shallow recess further comprises:
a pair of side shallow recess portions extending from the leading edge toward the trailing edge at both sides of the disk facing surface.

11. The hard disk drive of claim 8, wherein the air bearing surface further comprises:
a pair of side air bearing surface portions extending from the leading edge toward the trailing edge at both sides of the disk facing surface.

12. The hard disk drive of claim 11, wherein the shallow recess further comprises:
a fourth shallow recess portion formed on the pair of side air bearing surface portions.

13. The hard disk drive of claim 8, wherein a height difference between the air bearing surface and the shallow recess is about 0.08 μm to about 0.15 μm, and a height difference between the air bearing surface and the cavity recess is about 1.0 μm to about 2.5 μm.

14. The hard disk drive of claim 8, wherein one of the second air bearing surface portions faces air flowing between a surface of the disk and the disk facing surface of the head slider when the head slider is located at an inner disk position earlier than the other of the second air bearing surface portions, and has a first end portion adjacent to the trailing edge that is closer to a virtual center line of the disk facing surface extending from the leading edge to the trailing edge than a second end portion thereof adjacent to the leading edge.

* * * * *